US012327902B2

(12) United States Patent
Yang et al.

(10) Patent No.: US 12,327,902 B2
(45) Date of Patent: Jun. 10, 2025

(54) ELECTRICAL ISOLATION APPARATUS

(71) Applicant: Huawei Digital Power Technologies Co., Ltd., Shenzhen (CN)

(72) Inventors: Li Yang, Dongguan (CN); Zhenghua Zou, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 557 days.

(21) Appl. No.: 17/838,533

(22) Filed: Jun. 13, 2022

(65) Prior Publication Data

US 2022/0311113 A1 Sep. 29, 2022

Related U.S. Application Data

(63) Continuation of application No. PCT/CN2020/117117, filed on Sep. 23, 2020.

(51) Int. Cl.
*H01P 1/37* (2006.01)

(52) U.S. Cl.
CPC .................................... *H01P 1/37* (2013.01)

(58) Field of Classification Search
CPC .... H01P 1/37; H01P 5/028; H01P 5/02; H01P 1/36
See application file for complete search history.

(56) References Cited

U.S. PATENT DOCUMENTS

| | | | | |
|---|---|---|---|---|
| 8,823,216 B2 | 9/2014 | Fukunaga | | |
| 2008/0311862 A1* | 12/2008 | Spina | H01Q 1/38 | 455/78 |
| 2010/0020448 A1* | 1/2010 | Ng | H03F 3/45192 | 336/200 |
| 2014/0346887 A1* | 11/2014 | Bhamidipati | H02J 50/23 | 307/104 |
| 2015/0288061 A1* | 10/2015 | Liu | H01Q 1/526 | 29/601 |
| 2017/0110777 A1* | 4/2017 | Baba | H05K 1/0243 | |
| 2017/0125343 A1* | 5/2017 | Chang | H01L 23/5227 | |
| 2018/0005871 A1* | 1/2018 | Mollier | H01C 13/02 | |
| 2020/0076512 A1* | 3/2020 | O'Sullivan | H01F 27/288 | |
| 2023/0378878 A1* | 11/2023 | Murthy-Bellur | H02M 3/33569 | |

FOREIGN PATENT DOCUMENTS

| | | | |
|---|---|---|---|
| CN | 1914763 | A | 2/2007 |
| CN | 101803222 | A | 8/2010 |
| CN | 102386884 | A | 3/2012 |
| CN | 205069829 | U | 3/2016 |

(Continued)

*Primary Examiner* — An T Nguyen
(74) *Attorney, Agent, or Firm* — Maier & Maier, PLLC

(57) ABSTRACT

An electrical isolation apparatus. A signal is transmitted between a first transmission circuit, a first reference circuit, a second transmission circuit, and a second reference circuit according to a principle of electric field coupling between conductors. Therefore, the electrical isolation apparatus can be applied to isolation and transmission for a signal with a relatively high frequency between a first signal device and a second signal device. In addition, a material used by the electrical isolation apparatus may be a common metal conductor, which greatly reduces a size and costs of the electrical isolation apparatus and facilitates manufacturing and implementation of the electrical isolation apparatus.

11 Claims, 11 Drawing Sheets

(56) References Cited

FOREIGN PATENT DOCUMENTS

| | | | |
|---|---|---|---|
| CN | 108288742 | A | 7/2018 |
| JP | H09232822 | A | 9/1997 |
| JP | 2008067012 | A | 3/2008 |
| JP | 2009246810 | A | 10/2009 |
| WO | 2011034205 | A1 | 3/2011 |
| WO | 2014072335 | A1 | 5/2014 |

* cited by examiner

ELECTRICAL ISOLATION APPARATUS

CROSS-REFERENCE TO RELATED APPLICATION

This application is a continuation of International Application No. PCT/CN 2020/117117, filed on Sep. 23, 2020, which is hereby incorporated by reference in its entirety.

TECHNICAL FIELD

The embodiments relate to the field of electronic technologies, and an electrical isolation apparatus.

BACKGROUND

An electrical isolation apparatus is an apparatus that can be disposed between two devices and that can still transmit information between the two devices while physically isolating the two devices. For example, in a photovoltaic power generating system, an electrical isolation apparatus disposed between a solar panel and a control device can convert a signal with a relatively high voltage and a relatively large current that is sent by the solar panel into a signal with a relatively low voltage and a relatively small current, and then send the signal to the control device, thereby ensuring safety of the control device and safety of a person who is using the control device.

In a conventional technology, an implementation of the electrical isolation apparatus is an optical coupler. A light emitting diode and a light-sensitive element are encapsulated in one package. After a signal is received on one side of the light emitting diode and the light emitting diode is energized to emit light, the light-sensitive element receives the light, generates a signal, and transmits the signal to the other side. Signal isolation and information transmission are implemented in an electrical-optical-electrical manner. However, this manner has disadvantages such as a limited frequency and a relatively short service life. Another implementation of the electrical isolation apparatus is an isolation transformer. Windings and magnetic cores are disposed. When an input winding on one side receives a signal and generates a magnetic flux, an output winding generates an electrical signal and transmits the electrical signal to the other side. However, this manner has disadvantages such as a relatively large size.

In the conventional technology, the optical coupler is limited by a frequency and is not applicable to isolating a signal with a relatively high frequency, and the isolation transformer has a relatively large size. The two manners have respective disadvantages. Therefore, how to reduce a size of an electrical isolation apparatus while increasing an applicable frequency of the electrical isolation apparatus is a problem that needs to be resolved in the field.

SUMMARY

The embodiments provide an electrical isolation apparatus. A signal is transmitted between a first transmission circuit, a first reference circuit, a second transmission circuit, and a second reference circuit according to a principle of electric field coupling between conductors. Therefore, in embodiments, the electrical isolation apparatus can be applied to isolation and transmission for a signal with a relatively high frequency between a first signal device and a second signal device. In addition, a material used by the electrical isolation apparatus may be a common metal conductor, for example, a common PCB material, which greatly reduces a size and costs of the electrical isolation apparatus and facilitates manufacturing and implementation of the electrical isolation apparatus.

A first aspect provides an electrical isolation apparatus. The apparatus is connected to a first signal device through a primary stage and is connected to a second signal device through a secondary stage. A first reference circuit and a first transmission circuit of the primary stage, and a second transmission circuit and a second reference circuit of the secondary stage are not in contact with each other and are sequentially disposed in parallel to a first plane. A projection, on the first plane, of a second part included in the first transmission circuit overlaps with a projection of a second region of the second reference circuit on the first plane. In addition, a projection, on the first plane, of a fourth part included in the second transmission circuit overlaps with a projection of a fourth region of the first reference circuit on the first plane. In this case, when the first signal device sends an alternating current signal to the primary stage of the electrical isolation apparatus and positive charges are distributed in the second part of the first transmission circuit, negative charges are distributed in the second reference circuit through electric field coupling between the second part and the second region, and the secondary stage generates a second signal to be sent to the second signal device.

To sum up, the electrical isolation apparatus provided in embodiments transmits a signal between the primary stage and the secondary stage according to a principle of electric field coupling between conductors, so that a first signal can be immediately induced to the second reference circuit to generate a corresponding second signal, regardless of a frequency of the first signal, provided that a frequency change of the first signal causes a change of positive and negative charge distribution on the first transmission circuit. Therefore, the electrical isolation apparatus provided in these embodiments can be applied to isolation and transmission for a signal with a relatively high frequency, especially an RF signal. In addition, the electrical isolation apparatus provided in these embodiments includes circuits in which different conductors are located, and a material used by the electrical isolation apparatus may be a common metal conductor, for example, a common PCB material may be used for implementation. Compared with devices such as an optical coupler and a magnetic core, the electrical isolation apparatus greatly reduces its size and costs, so that the electrical isolation apparatus is easy to be manufactured and implemented.

In an embodiment of the first aspect, the electrical isolation apparatus further isolates and supports, by using insulation circuits, the first reference circuit, the first transmission circuit, the second transmission circuit, and the second reference circuit that are sequentially disposed in parallel. A first insulation circuit may be disposed between the first reference circuit and the first transmission circuit. A second insulation circuit may be disposed between the first transmission circuit and the second transmission circuit. A third insulation circuit may be disposed between the second transmission circuit and the second reference circuit.

To sum up, the insulation circuits disposed in this embodiment can isolate and support circuits disposed in parallel at different layers, so that the circuits at the layers can be disposed in parallel and are not in direct contact with each other, thereby helping transmit a signal between the circuits not in contact through electric field coupling and maintaining overall structural stability of the electrical isolation apparatus.

In an embodiment of the first aspect, the electrical isolation apparatus may be further connected to the first signal device and the second signal device through matching circuits, to perform impedance matching on the received first signal and second signal.

To sum up, the matching circuits are further provided on two sides of the insulation circuits disposed in this embodiment, so that a signal transmitted by the first signal device and the second signal device by using the electrical isolation apparatus, especially a high-frequency signal, can be transmitted without loss, and the signal is prevented from being reflected back to a source point. Therefore, an insertion loss caused by the electrical isolation apparatus added between the first signal device and the second signal device is reduced, and energy efficiency of signal transmission by the electrical isolation apparatus is improved.

In an embodiment of the first aspect, a shape of the second part that extends from the first transmission circuit and whose projection overlaps with the projection of the first reference circuit, and a shape of the fourth part that extends from the second transmission circuit and whose projection overlaps with the projection of the second reference circuit, may be arranged as a circular shape, a rectangular shape, a ring shape, a shape of a letter L, or the like, and the shape of the second part is the same as that of the fourth part.

To sum up, in the electrical isolation apparatus provided in this embodiment, the second part of the first transmission circuit and the fourth part of the second transmission circuit may be disposed in different shapes. Therefore, when the electrical isolation apparatus is used in different scenarios, the electrical isolation apparatus may vary based on various factors such as different working conditions, circuit design requirements, and limitations on space in a device, and the shapes of the second part and the fourth part are flexibly arranged, thereby enriching application scenarios of the electrical isolation apparatus and improving application flexibility.

In an embodiment of the first aspect, materials of the first transmission circuit, the second transmission circuit, the first reference circuit, and the second reference circuit in the electrical isolation apparatus may be copper foil metal conductors; and materials of the first insulation circuit, the second insulation circuit, and the third insulation circuit disposed in the electrical isolation apparatus may be filler insulation materials.

To sum up, in the electrical isolation apparatus provided in this embodiment, the transmission circuits and the reference circuits may be implemented by using the copper foil metal conductors, and the insulation circuits may be implemented by using the filler insulation materials. On a basis of implementing the electrical isolation apparatus by using a circuit with a relatively small size, a material used by the electrical isolation apparatus is also a common material such as a conductor, which greatly reduces costs of the electrical isolation apparatus, and facilitates manufacturing and implementation of the electrical isolation apparatus. In addition, the metal conductors do not easily age, and do not decay with changes of time and operating environments during operating, thereby further extending a service life of the electrical isolation apparatus, improving reliability, and reducing costs caused by frequently updating the electrical isolation apparatus.

A second aspect provides an electrical isolation apparatus. The apparatus is connected to a first signal device through a primary stage and is connected to a second signal device through a secondary stage. A first transmission circuit includes a first part and a second part. A projection of the first part on a first plane falls within a projection of a first return structure on the first plane. A projection of the second part of the first transmission circuit on the first plane overlaps with a projection of a second region of a second reference circuit on the first plane. A second transmission circuit includes a third part and a fourth part. A projection of the third part of the second transmission circuit on the first plane falls within a projection of a second return structure on the first plane. A projection of the fourth part of the second transmission circuit on the first plane overlaps with a projection of a fourth region of a first reference circuit on the first plane. In this case, the first transmission circuit, the second reference circuit, the second transmission circuit, and the first reference circuit may be configured to implement signal isolation and information transmission between devices on two sides of the electrical isolation apparatus.

To sum up, when transmitting a signal between the primary stage and the secondary stage according to a principle of electric field coupling between conductors, the electrical isolation apparatus provided in this embodiment can be applied to isolation and transmission for a signal with a relatively high frequency, and a size and costs of the electrical isolation apparatus are reduced. Therefore, on a basis of facilitating manufacturing and implementation of the electrical isolation apparatus, a PCB with fewer layers is used for implementation, thereby reducing structural complexity of the electrical isolation apparatus, and making implementation of the electrical isolation apparatus more flexible.

In an embodiment of the second aspect, the electrical isolation apparatus isolates and supports, by using an insulation circuit, circuits disposed in parallel at different layers. A fourth insulation circuit is disposed between a plane on which the first transmission circuit, the first reference circuit, and the second return circuit are located and a plane on which the second transmission circuit, the second reference circuit, and the first return circuit are located.

In an embodiment of the second aspect, the electrical isolation apparatus may be further connected to the first signal device and the second signal device through matching circuits, to perform impedance matching on a received first signal and second signal.

In an embodiment of the second aspect, a shape of the second part that extends from the first transmission circuit and whose projection overlaps with the projection of the first reference circuit, and a shape of the fourth part that extends from the second transmission circuit and whose projection overlaps with the projection of the second reference circuit, may be arranged as a circular shape, a rectangular shape, a ring shape, a shape of a letter L, or the like, and the shape of the second part is the same as that of the fourth part.

In an embodiment of the second aspect, materials of the first transmission circuit, the second transmission circuit, the first reference circuit, and the second reference circuit in the electrical isolation apparatus may be copper foil metal conductors; and a material of the fourth insulation circuit disposed in the electrical isolation apparatus may be a filler insulation material.

In an embodiment of a third aspect, a signal transmission method is provided. An electronic device serving as an execution entity obtains a first signal from a first signal device, inputs the first signal into a first transmission circuit and a first reference circuit, receives a second signal output by the second transmission circuit and the second reference circuit, and then sends the second signal to a second signal device. The first reference circuit, the first transmission circuit, the second transmission circuit, and the second reference circuit are not in contact with each other and are sequentially disposed in parallel to a first plane. There is a spacing between a projection of the first reference circuit on the first plane and a projection of the second reference circuit on the first plane. The first transmission circuit includes a first part and a second part. A projection of the first part on the first plane overlaps with a projection of a first region of the first reference circuit on the first plane. A projection of the second part on the first plane overlaps with a projection of a second region of the second reference circuit on the first plane. The second transmission circuit includes a third part and a fourth part. A projection of the third part on the first plane overlaps with a projection of a third region of the second reference circuit on the first plane. A projection of the fourth part on the first plane overlaps with a projection of a fourth region of the first reference circuit on the first plane.

To sum up, in the signal transmission method provided in this embodiment, when the first signal device and the second signal device are not in contact, the first signal sent by the first signal device can be converted into the second signal, and then the second signal can be sent to the second signal device. Therefore, information transmission between the first signal device and the second signal device is not affected while electrical isolation is implemented between the first signal device and the second signal device. Particularly, in this embodiment, a signal is transmitted between the first transmission circuit, the first reference circuit, the second transmission circuit, and the second reference circuit according to a principle of electric field coupling between conductors. Therefore, this embodiment can be applied to isolation and transmission for a signal with a relatively high frequency, especially an RF signal, between the first signal device and the second signal device. Therefore, application scenarios are enriched, and signal isolation and transmission are not limited by a signal frequency. In addition, a material used for the first transmission circuit, the first reference circuit, the second transmission circuit, and the second reference circuit configured to implement the signal transmission method in this embodiment may be a common metal conductor, for example, a common PCB material may be used for implementation, thereby greatly reducing a size and costs of the electrical isolation apparatus, and facilitating manufacturing and implementation of the electrical isolation apparatus. In other words, in the method provided in this embodiment, a frequency applicable to isolating the first signal device from the second signal device can be increased, and a signal can be converted by using a circuit with a relatively small size and relatively low costs.

In an embodiment of the third aspect, a first insulation circuit is further disposed between the first reference circuit and the first transmission circuit, where the first insulation circuit is parallel to the first plane and is configured to isolate the first reference circuit from the first transmission circuit. A second insulation circuit is further disposed between the first transmission circuit and the second transmission circuit, where the second insulation circuit is parallel to the first plane and is configured to isolate the first transmission circuit from the second transmission circuit. A third insulation circuit is further disposed between the second transmission circuit and the second reference circuit, where the third insulation circuit is parallel to the first plane and is configured to isolate the second transmission circuit from the second reference circuit.

In an embodiment of the third aspect, the first reference circuit and the first transmission circuit are further connected to the first signal device through a first matching circuit, and the first matching circuit is configured to perform impedance matching on a signal passing through the first matching circuit. The second transmission circuit and the second reference circuit are further connected to the second signal device through a second matching circuit, and the second matching circuit is configured to perform impedance matching on a signal passing through the second matching circuit.

In an embodiment of the third aspect, a shape of the second part includes a circular shape, a rectangular shape, a ring shape, or a shape of a letter L; and a shape of the fourth part is the same as that of the second part.

In an embodiment of the third aspect, materials of the first transmission circuit, the second transmission circuit, the first reference circuit, and the second reference circuit are copper foil metal conductors; and materials of the first insulation circuit, the second insulation circuit, and the third insulation circuit are filler insulation materials.

In an embodiment of a fourth aspect, a signal transmission method is provided. An electronic device serving as an execution entity obtains a first signal from a first signal device, inputs the first signal into a first transmission circuit and a first reference circuit, receives a second signal output by the first transmission circuit and the second reference circuit, and then sends the second signal to a second signal device. The first transmission circuit, the first reference circuit, and a second return circuit are disposed on a same plane. The second transmission circuit, the second reference circuit, and a first return circuit are disposed on a same plane. The first reference circuit, the first transmission circuit, the second transmission circuit, the second reference circuit, the first return circuit, and the second return circuit are not in contact with each other and are each disposed in parallel to a first plane. There is a spacing between a projection of the first reference circuit on the first plane and a projection of the second return circuit on the first plane. There is a spacing between a projection of the second reference circuit on the first plane and a projection of the first return circuit on the first plane. The first transmission circuit includes a first part and a second part. A projection of the first part on the first plane falls within a projection, on the first plane, of a first return structure disposed in the first return circuit. A projection of the second part on the first plane overlaps with a projection of a second region of the second reference circuit on the first plane. The second transmission circuit includes a third part and a fourth part. A projection of the third part on the first plane falls within a projection, on the first plane, of a second return structure disposed in the second return circuit. A projection of the fourth part on the first plane overlaps with a projection of a fourth region of the first reference circuit on the first plane.

To sum up, in the signal transmission method provided in this embodiment, when the first signal device and the second signal device are not in contact, the first signal sent by the first signal device can be converted into the second signal, and then the second signal can be sent to the second signal device. Therefore, information transmission between the first signal device and the second signal device is not affected while electrical isolation is implemented between the first signal device and the second signal device. Particularly, in this embodiment, a signal is transmitted between the first transmission circuit, the first reference circuit, the second transmission circuit, and the second reference circuit according to a principle of electric field coupling between conductors. Therefore, this embodiment can be applied to isolation and transmission for a signal with a relatively high frequency, especially an RF signal, between the first signal device and the second signal device, thereby enriching application scenarios and avoiding a limitation by a signal frequency when a signal is being isolated and transmitted. In addition, a material used for the first transmission circuit, the first reference circuit, the second transmission circuit, and the second reference circuit configured to implement the signal transmission method in this embodiment may be a common metal conductor, for example, a common PCB material may be used for implementation, thereby greatly reducing a size and costs of the electrical isolation apparatus, and facilitating manufacturing and implementation of the electrical isolation apparatus. In other words, the method provided in this embodiment can be applied to isolation and transmission for a signal with a relatively high frequency, and a size and costs of an apparatus required for implementing the method are reduced. Therefore, on a basis of facilitating manufacturing and implementation of the apparatus on which the method provided in this embodiment is based, a PCB with fewer layers is used for implementation, thereby reducing structural complexity of the apparatus, and making implementation of the apparatus more flexible.

In an embodiment of the fourth aspect, a fourth insulation circuit is further disposed between a plane on which the first transmission circuit, the first reference circuit, and the second return circuit are located and a plane on which the second transmission circuit, the second reference circuit, and the first return circuit are located.

In an embodiment of the fourth aspect, the first reference circuit and the first transmission circuit are further connected to the first signal device through a first matching circuit, and the first matching circuit is configured to perform impedance matching on a signal passing through the first matching circuit. The second transmission circuit and the second reference circuit are further connected to the second signal device through a second matching circuit, and the second matching circuit is configured to perform impedance matching on a signal passing through the second matching circuit.

In an embodiment of the fourth aspect, a shape of the second part includes a circular shape, a rectangular shape, a ring shape, or a shape of a letter L; and a shape of the fourth part is the same as that of the second part.

In an embodiment of the fourth aspect, materials of the first transmission circuit, the second transmission circuit, the first reference circuit, and the second reference circuit are copper foil metal conductors; and a material of the fourth insulation circuit is a filler insulation material.

According to a fifth aspect, an embodiment provides a chip, including a processor and a communications interface. The communications interface is configured to implement communication with another device. The processor is configured to read instructions to implement the method according to the third aspect or the fourth aspect.

According to a sixth aspect, an embodiment provides a computer program product. The computer program product includes computer program code. When the computer program code is executed by a computer, the computer is enabled to perform the method according to the third aspect or the fourth aspect.

DETAILED DESCRIPTION OF THE EMBODIMENTS

Figure 1:
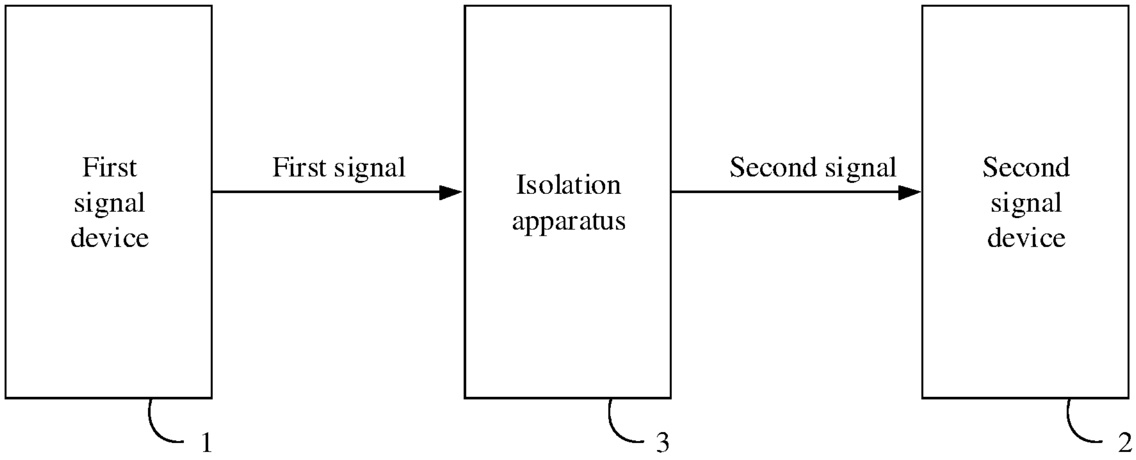
FIG. 1 is a schematic diagram of an application scenario.

FIG. 1 is a schematic diagram of an application scenario that may be applied to a scenario of electrically isolating different devices, as shown in FIG. 1. In FIG. 1, for example, an electrical isolation apparatus 3 may be configured to electrically isolate a first signal device 1 from a second signal device 2. When the first signal device 1 sends a first signal to the second signal device, if the first signal has a relatively large current or a relatively high voltage, direct transmission of the first signal to the second signal device 2 may pose a safety hazard to the second signal device 2 and a person operating the device. In this case, the electrical isolation apparatus 3 may be disposed on an electrical connection path between the first signal device 1 and the second signal device 2. The electrical isolation apparatus 3 converts, into a second signal with a relatively small current or a relatively low voltage, the first signal that is output by the first signal device 1 and that has a relatively large current or a relatively high voltage, and outputs the second signal to the second signal device 2.

In the scenario shown in FIG. 1, according to a first aspect, the disposed electrical isolation apparatus 3 may process the first signal sent by the first signal device 1, and then send a processed signal to the second signal device 2, to prevent the first signal from being directly transmitted from the first signal device 1 to the second signal device 2, and relieve a safety hazard posed by the first signal to the second signal device 2. According to a second aspect, although the electrical isolation apparatus 3 does not directly transmit the first signal from the first signal device 1 to the second signal device 2, energy, information, or the like carried in the first signal may still be transmitted to the second signal device 2 by using the second signal obtained through processing by the electrical isolation apparatus 3. Therefore, normal communication between the first signal device 1 and the second signal device 2 is not affected while a safety hazard is relieved.

The electrical isolation apparatus shown in FIG. 1 may be applied to a situation in which currents and voltages of signals processed by two devices are different, or the two devices are connected to different ground potentials, but information still needs to be exchanged between the two devices. In this case, the electrical isolation apparatus may be disposed between the two devices. In this way, information can be exchanged between the two independent devices while direct signal transmission is avoided to ensure safety of the devices and personnel.

For example, in the field of photovoltaic power generating technologies, an electrical signal generated by a solar panel from sunlight is transmitted to a power grid to generate power. In addition, with development of communications technologies, a photovoltaic power generating operator may use a control device, such as a mobile phone or a computer, to obtain a working status of the solar panel, adjust a working parameter of the solar panel, and the like, to meet an intelligent control requirement of the operator. However, the electrical signal output by the solar panel has an excessively high voltage. When the operator uses the control device to control the solar panel, if the electrical signal of the solar panel can be directly transmitted to the control device, not only the control device but also the operator is harmed. Therefore, to ensure safety of the device and the operator in use, an electrical isolation apparatus may be disposed between the solar panel and the device, so that a first signal that is output by the solar panel and that has a relatively high voltage may be converted into a second signal with a relatively low voltage, and then the second signal is sent to the device used by the operator.

Figure 2:
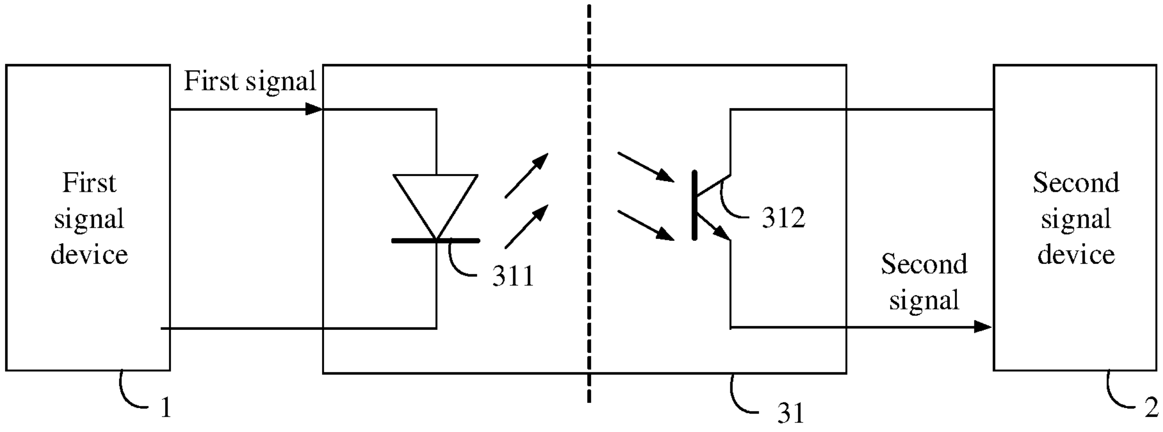
FIG. 2 is a schematic diagram of a structure of an electrical isolation apparatus.

FIG. 2 is a schematic diagram of a structure of an electrical isolation apparatus and shows a manner of disposing the electrical isolation apparatus 3 shown in FIG. 1 when the electrical isolation apparatus 3 is an optical coupler (OC) 31. In the optical coupler 31, a light emitter 311, such as, for example, an infrared light emitting diode (ILED) and a light receiver 312 (for example, a light sensitive semiconductor transistor or a light sensitive resistor) are encapsulated in one package. The light emitter 311 emits light when a signal passes through the light emitter 311, and the light receiver 312 generates a photocurrent after receiving the light, thereby implementing "electrical-optical-electrical" conversion. As shown in FIG. 2, an input end of the optical coupler 31, that is, the light emitter 311, is connected to the first signal device 1; and an output end of the optical coupler 31, that is, the light receiver 312, is connected to the second signal device 2. When a first signal input by the first signal device 1 passes through the light emitter 311, the light emitter 311 converts the electrical signal into an optical signal to emit light. After receiving the light, the light receiver 312 outputs a second signal to the second signal device 2. In this case, the first signal and the second signal are independent of each other, and voltages of the first signal and the second signal may be different. The optical coupler 31 implements signal isolation and information transmission between devices on two sides.

Although the optical coupler 31 shown in FIG. 2 is relatively widely used, the optical coupler 31 has the following obvious disadvantages: First, a conversion rate between the light emitter 311 and the light receiver 312 in the optical coupler 31 has an upper limit. As a result, the optical coupler 31 can be used to transmit only a first signal whose frequency is less than 10 MHz. For a first signal with a higher frequency, the first signal cannot be converted into a second signal at a higher conversion rate. In addition, costs of an optical coupler 31 with a higher conversion rate are higher. Therefore, the optical coupler 31 is usually used only in a scenario of isolating a low-frequency signal at a high voltage. Second, a service life of the diode disposed in the optical coupler 31 is relatively short, and light emitting efficiency of the diode decays with changes of time and operating environments, thereby reducing a service life of the optical coupler 31, and reducing reliability. Third, the optical coupler 31 can perform only unidirectional signal transmission in a direction from the light emitter 311 to the light receiver 312. Therefore, bidirectional signal transmission cannot be implemented between devices connected to two sides of the optical coupler 31.

Figure 3:
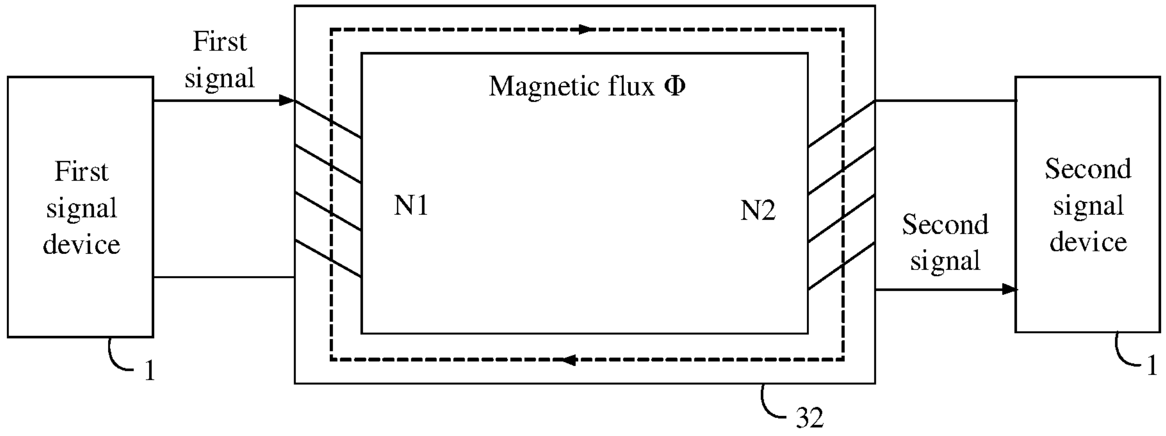
FIG. 3 is a schematic diagram of a structure of another electrical isolation apparatus.

FIG. 3 is a schematic diagram of a structure of another electrical isolation apparatus and shows a manner of disposing the electrical isolation apparatus 3 shown in FIG. 1 when the electrical isolation apparatus 3 is an isolation transformer 32. An input winding N1 of the isolation transformer 32 is connected to the first signal device 1, and an output winding N2 is connected to the second signal device 2. In this case, when a first signal output by the first signal device 1 passes through the input winding N1, the first signal generates a magnetic flux D in a magnetic core according to Faraday's law of electromagnetic induction. The magnetic flux D in the same magnetic core causes the output winding N2 to output a second signal to the second signal device 2, thereby implementing "electrical-magnetic-electrical" conversion. Similarly, the first signal and the second signal can be independent of each other, and voltages of the first signal and the second signal may be different, thereby implementing signal isolation and information transmission between devices on two sides and implementing isolation for a signal with a relatively high frequency.

The isolation transformer 32 shown in FIG. 3 also has the following disadvantages: First, the isolation transformer 32 usually has a relatively large size, and the size increases with an increase in a voltage difference between input and output signals, thereby causing inconvenience. Second, the isolation transformer 32 is not applicable to isolating a high-frequency signal. To implement safety isolation, a signal attenuation is relatively large.

Therefore, in view that the electrical isolation apparatuses shown in FIG. 2 and FIG. 3 have respective disadvantages, there is a need for an electrical isolation apparatus can be applied to isolation for a high-frequency signal, and reliability of the electrical isolation apparatus is improved. In addition, a size and costs can be reduced, and a service life of the electrical isolation apparatus is increased. The high-frequency signal may be at least a radio frequency (RF) signal within a frequency range of 300 kHz to 300 GHz.

The embodiments are used below to describe in detail the solutions. The following embodiments may be combined with each other, and a same or similar concept or process may not be described repeatedly in some embodiments.

Figure 4:
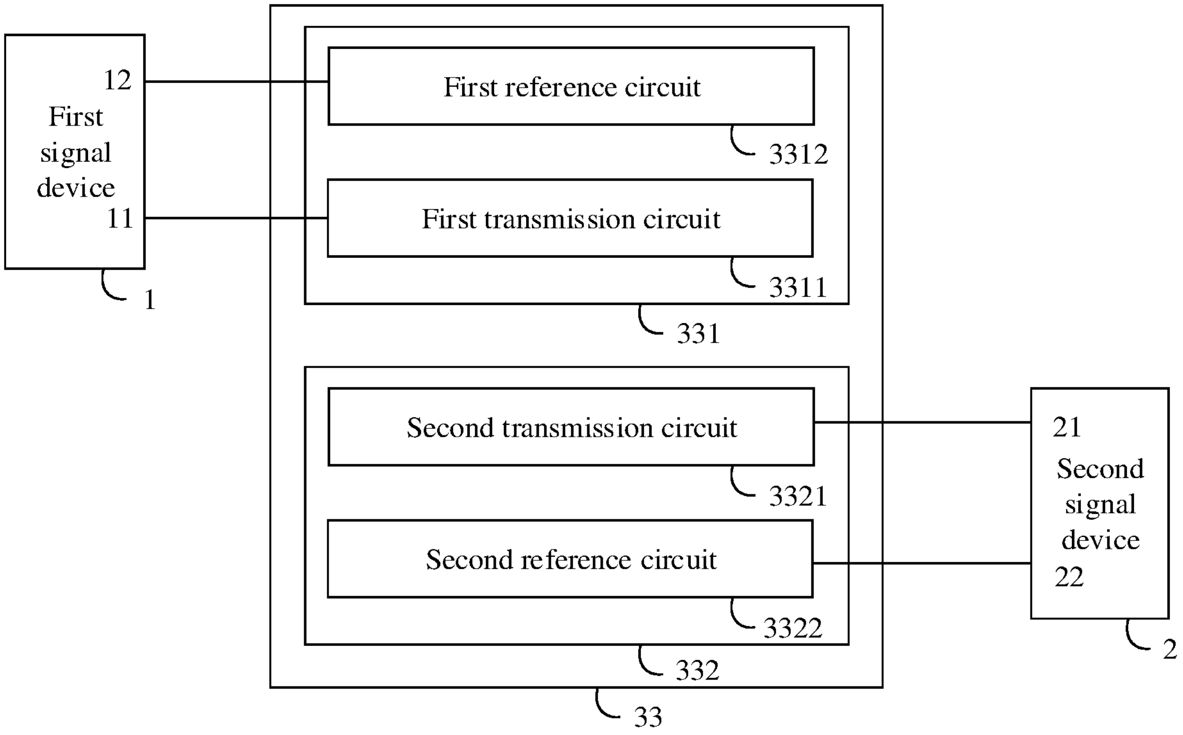
FIG. 4 is a schematic diagram of a structure of an embodiment of an electrical isolation apparatus.

FIG. 4 is a schematic diagram of a structure of an embodiment of an electrical isolation apparatus. As shown in FIG. 4, the electrical isolation apparatus 33 provided in this embodiment is disposed between a first signal device 1 and a second signal device 2. When the first signal device 1 outputs a first signal to the electrical isolation apparatus 33, the electrical isolation apparatus 33 may convert the first signal into a second signal and output the second signal to the second signal device 2. When the second signal device 2 outputs a third signal to the electrical isolation apparatus 33, the electrical isolation apparatus 33 may convert the third signal into a fourth signal and output the fourth signal to the first signal device 1. In other words, the electrical isolation apparatus provided in this embodiment may implement bidirectional transmission. In the example shown in FIG. 4, a principle of the electrical isolation apparatus 33 is described by using unidirectional transmission as an example in which the first signal device 1 sends the first signal to the electrical isolation apparatus 33, and the electrical isolation apparatus 33 outputs the second signal to the second signal device 2.

The first signal device 1 includes a first terminal 11 and a second terminal 12 that may be configured to send/receive an alternating current signal. In a positive half-cycle of an alternating current, the first signal device 1 may output a forward current to the electrical isolation apparatus 33 through the first terminal 11 of the first signal device 1, and a current returns through the second terminal 12. In a negative half-cycle of the alternating current, the first signal device 1 may output a forward current to the electrical isolation apparatus 33 through the second terminal 12 of the first signal device 1, and a current returns through the first terminal 11. The second signal device 2 includes a first terminal 21 and a second terminal 22 that may be configured to send/receive an alternating current signal. In a positive half-cycle of an alternating current, the second signal device 2 may output a forward current to the electrical isolation apparatus 33 through the first terminal 21 of the second signal device 2, and a current returns through the second terminal 22. In a negative half-cycle of the alternating current, the second signal device 2 may output a forward current to the electrical isolation apparatus 33 through the second terminal 22 of the second signal device 2, and a current returns through the first terminal 21.

The electrical isolation apparatus 33 provided in this embodiment includes a primary stage 331 and a secondary stage 332. The primary stage 331 is connected to the first signal device 1, and the secondary stage 332 is connected to the second signal device 2. The primary stage 331 and the secondary stage 332 are disposed independently and are not in contact with each other.

The primary stage 331 includes a first transmission circuit 3311 and a first reference circuit 3312. The two circuits are connected to the two terminals of the first signal device 1 in a one-to-one correspondence. For example, the first transmission circuit 3311 is connected to the first terminal 11 of the first signal device 1, and the first reference circuit 3312 is connected to the second terminal 12 of the first signal device 1. The secondary stage 332 includes a second transmission circuit 3321 and a second reference circuit 3322. The two circuits are connected to the two terminals of the second signal device 2 in a one-to-one correspondence. For example, the second transmission circuit 3321 is connected to the first terminal 21 of the second signal device, and the second reference circuit 3322 is connected to the second terminal 22 of the second signal device.

Figure 5:
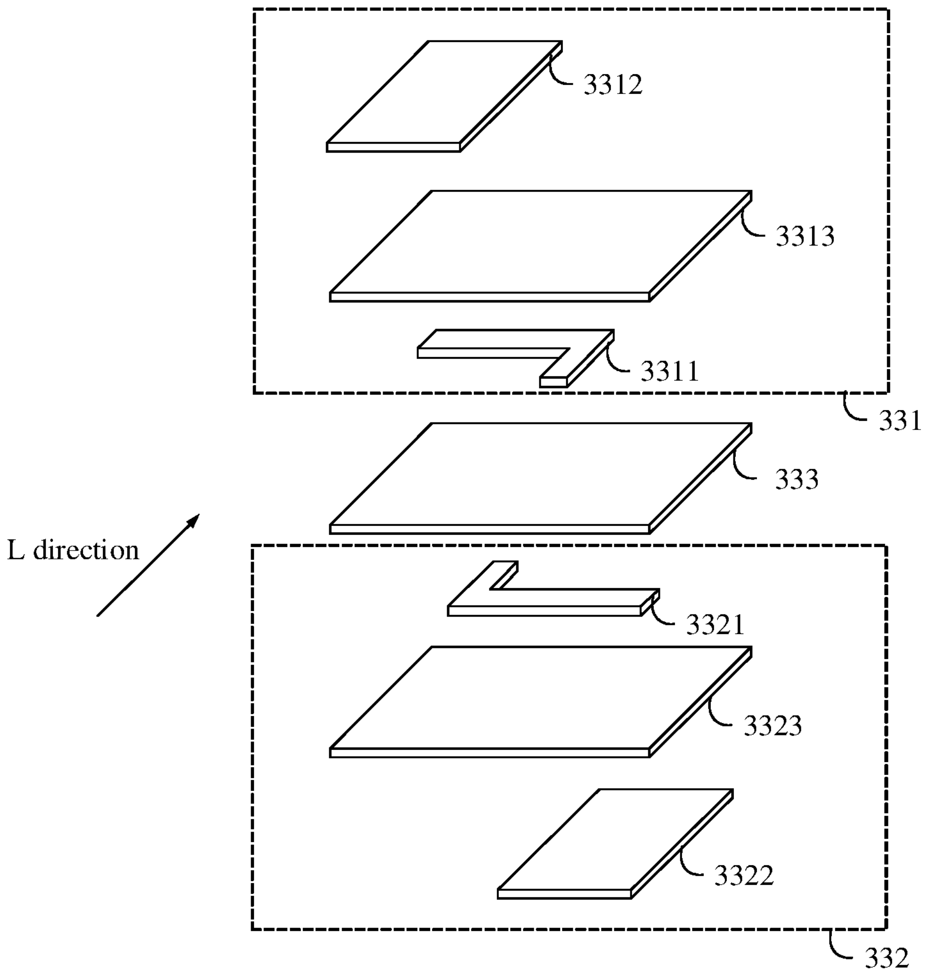
FIG. 5 is a schematic diagram of a hierarchical structure of an electrical isolation apparatus.

FIG. 5 is a schematic diagram of a hierarchical structure of the electrical isolation apparatus. As shown in the figure, in the electrical isolation apparatus provided in this embodiment, the first reference circuit 3312, the first transmission circuit 3311, the second transmission circuit 3321, and the second reference circuit 3322 are not in contact with each other and are sequentially disposed in parallel to one plane (denoted as a first plane) from top to bottom in the figure.

Optionally, an insulation circuit may be disposed between two adjacent circuits of the four circuits that are not in contact with each other, to isolate different circuits. For example, a first insulation circuit 3313 is disposed between the first reference circuit 3312 and the first transmission circuit 3311, a second insulation circuit 333 is disposed between the first transmission circuit 3311 and the second transmission circuit 3321, and a third insulation circuit 3323 is disposed between the second transmission circuit 3321 and the second reference circuit 3322. The first insulation circuit 3313, the second insulation circuit 333, and the third insulation circuit 3323 are also disposed in parallel to the first plane. In addition, each insulation circuit may be configured to isolate circuits disposed on two sides, and the insulation circuit may be in contact with the circuits disposed on the two sides.

Further, although the first reference circuit 3312, the first transmission circuit 3311, the second transmission circuit 3321, and the second reference circuit 3322 provided in this embodiment are all disposed in parallel to the first plane, projections of these circuits on the first plane do not exactly overlap. With reference to FIG. 6 to FIG. 10, the following describes space arrangement requirements that at least need to be met by the first reference circuit 3312, the first transmission circuit 3311, the second transmission circuit 3321, and the second reference circuit 3322 in the electrical isolation apparatus provided in this embodiment. The electrical isolation apparatus provided in this embodiment should meet all of the following three arrangement requirements.

Figure 6:
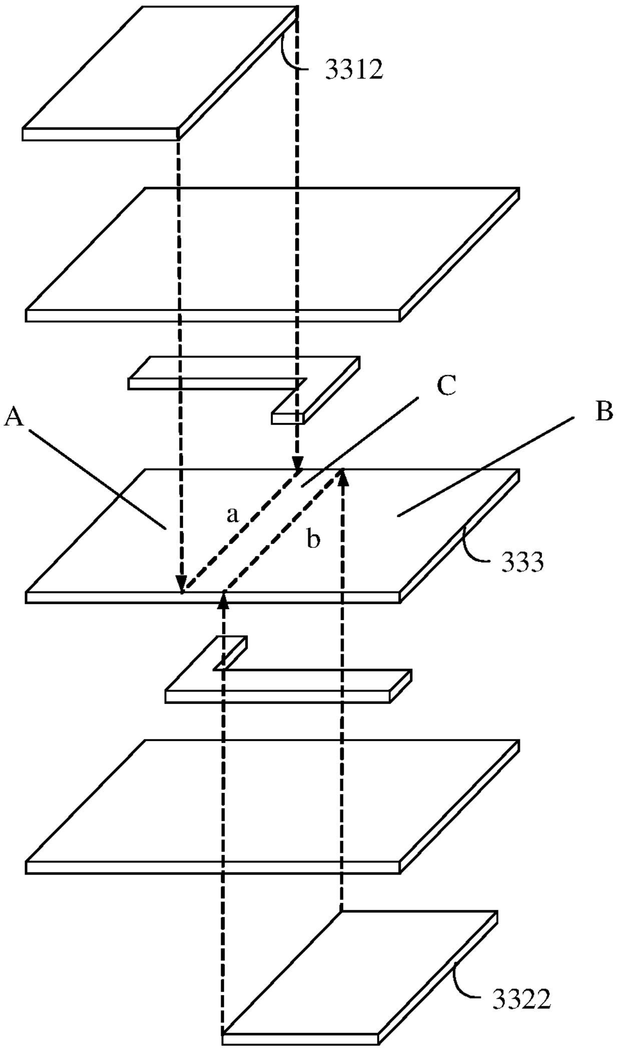
FIG. 6 is a schematic diagram of a projection of a reference circuit.

Arrangement requirement 1: There is a spacing between projections of the first reference circuit 3312 and the second reference circuit 3322 on the first plane. For example, FIG. 6 is a schematic diagram of a projection of a reference circuit. For example, shapes of the first reference circuit 3312 and the second reference circuit 3322 are a rectangular shape. The shapes of the foregoing two reference circuits are not limited and may be alternatively another shape such as a circular shape or a triangular shape. A plane on which the second insulation circuit 333 between the first reference circuit 3312 and the second reference circuit 3322 is located serves as a base plane of the first plane. In this case, in FIG. 6, a projection of the first reference circuit 3312 on the first plane overlaps with a region A of the second insulation circuit 333, and a projection of the second reference circuit 3322 on the first plane overlaps with a region B of the second insulation circuit 333. It can be understood that the region A and the region B have no overlapping part, and a region C between an edge a of the region A and an edge b of the region B separates the region A from the region B.

Arrangement requirement 2: Projections of the first transmission circuit 3311 and the second transmission circuit 3321 on the first plane have no overlapping region. In addition, Projection of a part of the first transmission circuit 3311 and the first reference circuit 3312 have an overlapping region, projection of a part of the first transmission circuit 3311 and the second reference circuit 3322 have an overlapping region, projection of a part of the second transmission circuit 3321 and the second reference circuit 3322 have an overlapping region, and projection of a part of the second transmission circuit 3321 and the first reference circuit 3312 have an overlapping region.

Figure 7:
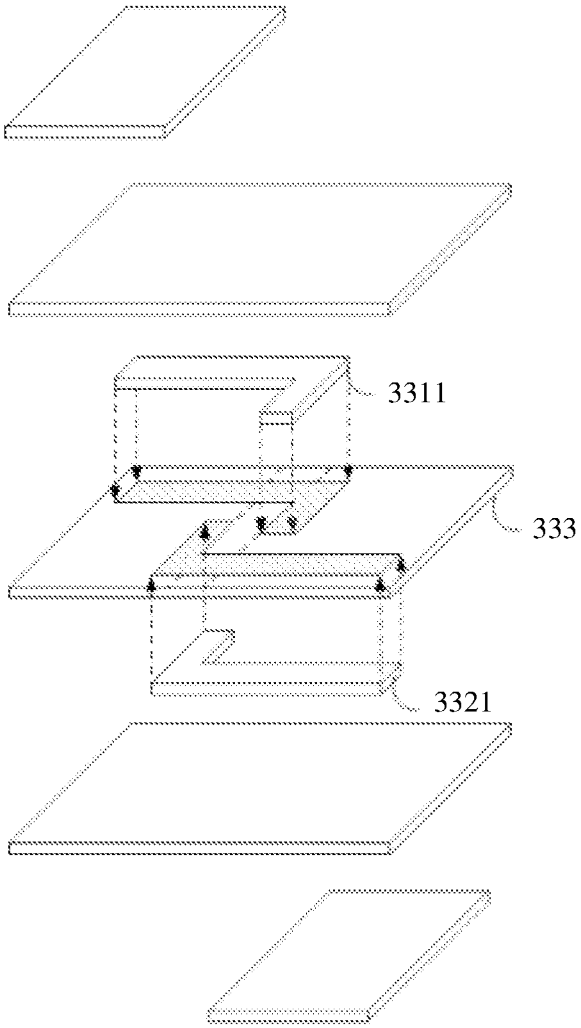
FIG. 7 is a schematic diagram of a projection of a transmission circuit.

For example, FIG. 7 is a schematic diagram of a projection of a transmission circuit. For example, shapes of the first transmission circuit 3311 and the second transmission circuit 3321 may be an "L shape". The shapes of the foregoing two transmission circuits are not limited and may be alternatively another shape such as a circular shape, a triangular shape, or a ring shape. A plane on which the second insulation circuit 333 is located serves as a base plane of the first plane. In this case, in FIG. 7, a projection of the first transmission circuit 3311 on the first plane overlaps with a part of a region A (a projection of the first reference circuit 3312 on the first plane), a part of a region B (a projection of the second reference circuit 3322 on the first plane), and a part of a region C of the second insulation circuit 333. A projection of the second transmission circuit 3321 on the first plane also overlaps with a part of the region A, a part of the region B, and a part of the region C of the second insulation circuit 333.

Figure 8:
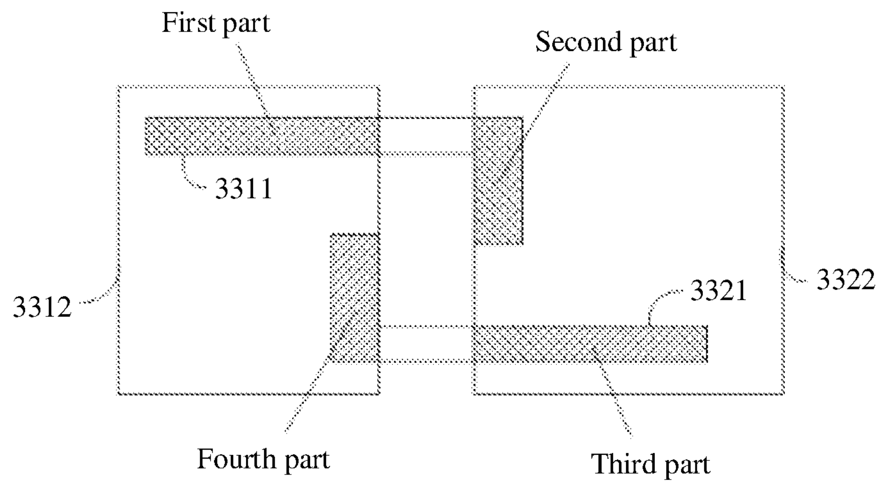
FIG. 8 is a schematic diagram of division of different parts of a transmission circuit.
Figure 9:
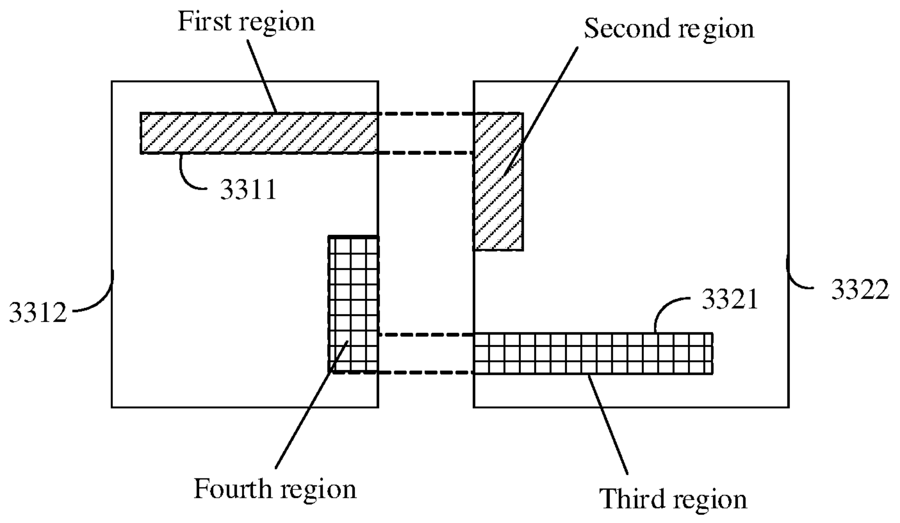
FIG. 9 is a schematic diagram of division of different regions of a reference circuit.

FIG. 8 is a schematic diagram of division of different parts of a transmission circuit, and FIG. 9 is a schematic diagram of division of different regions of a reference circuit. As shown in FIG. 8, the first transmission circuit 3311 may be divided into a first part and a second part. A projection of the first part on the first plane overlaps with a projection, on the first plane, of a first region of the first reference circuit 3312 shown in FIG. 9. A projection of the second part on the first plane overlaps with a projection, on the first plane, of a second region of the second reference circuit 3322 shown in FIG. 9. As shown in FIG. 8, the second transmission circuit 3321 may be divided into a third part and a fourth part. A projection of the third part on the first plane overlaps with a projection, on the first plane, of a third region of the second reference circuit 3322 shown in FIG. 9. A projection of the fourth part on the first plane overlaps with a projection, on the first plane, of a fourth region of the first reference circuit 3312 shown in FIG. 9.

Figure 10:
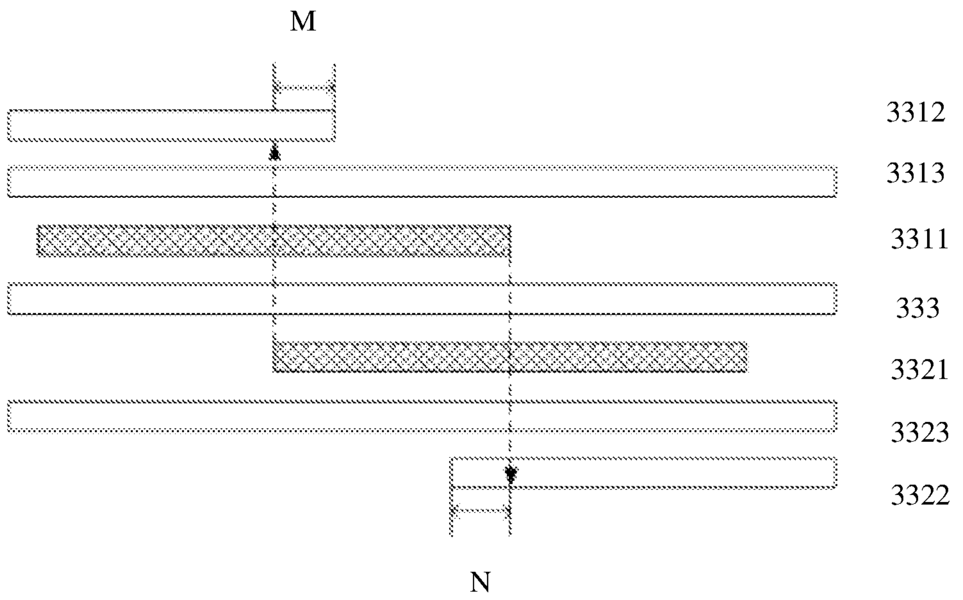
FIG. 10 is a schematic diagram of a structure of a cross section of an electrical isolation apparatus.

Arrangement requirement 3: A projection of an insulation circuit on a first plane may cover projections, on the first plane, of circuits on two sides of the insulation circuit. For example, FIG. 10 is a schematic diagram of a structure of a cross section of the electrical isolation apparatus and shows a cross section of the electrical isolation apparatus observed from an L direction shown in FIG. 5. On the cross section, the first insulation circuit 3313 extends beyond ends of the first reference circuit 3312 and the first transmission circuit 3311 that are disposed on two sides of the first insulation circuit 3313 and is disposed between the first transmission circuit 3311 and the first reference circuit 3312. Therefore, the first reference circuit 3312 and the first transmission circuit 3311 can be completely isolated physically, without parts in direct contact or facing each other. In addition, the first insulation circuit 3313 is configured to support the first transmission circuit 3311 and the first reference circuit 3312. On the cross section, the second insulation circuit 333 extends beyond ends of the first transmission circuit 3311 and the second transmission circuit 3321 that are disposed on two sides of the second insulation circuit 333 and is disposed between the first transmission circuit 3311 and the second transmission circuit 3321. Therefore, the first transmission circuit 3311 and the second transmission circuit 3321 can be completely isolated physically, without parts in direct contact or facing each other. In addition, the second insulation circuit 333 is configured to support the first transmission circuit 3311 and the second transmission circuit 3321. On the cross section, the third insulation circuit 3323 extends beyond ends of the second transmission circuit 3321 and the second reference circuit 3322 that are disposed on two sides of the third insulation circuit 3323 and is disposed between the second transmission circuit 3321 and the second reference circuit 3322. Therefore, the second transmission circuit 3321 and the second reference circuit 3322 can be completely isolated physically, without parts in direct contact or facing each other. In addition, the third insulation circuit 3323 is configured to support the second transmission circuit 3321 and the second reference circuit 3322. In addition, it can be understood from the cross-sectional view shown in FIG. 10 that, in the electrical isolation apparatus provided in this embodiment, a length of the first part of the first transmission circuit 3311 that extends to the second reference circuit 3322 is N, and a length of the third part of the second transmission circuit 3321 that extends to the first reference circuit 3312 is M.

Figure 11:
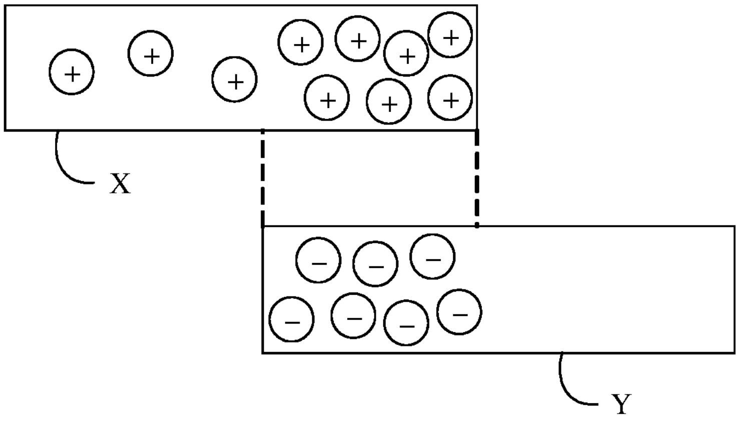
FIG. 11 is a schematic diagram of a principle of electric field coupling in an electrical isolation apparatus.
Figure 12:
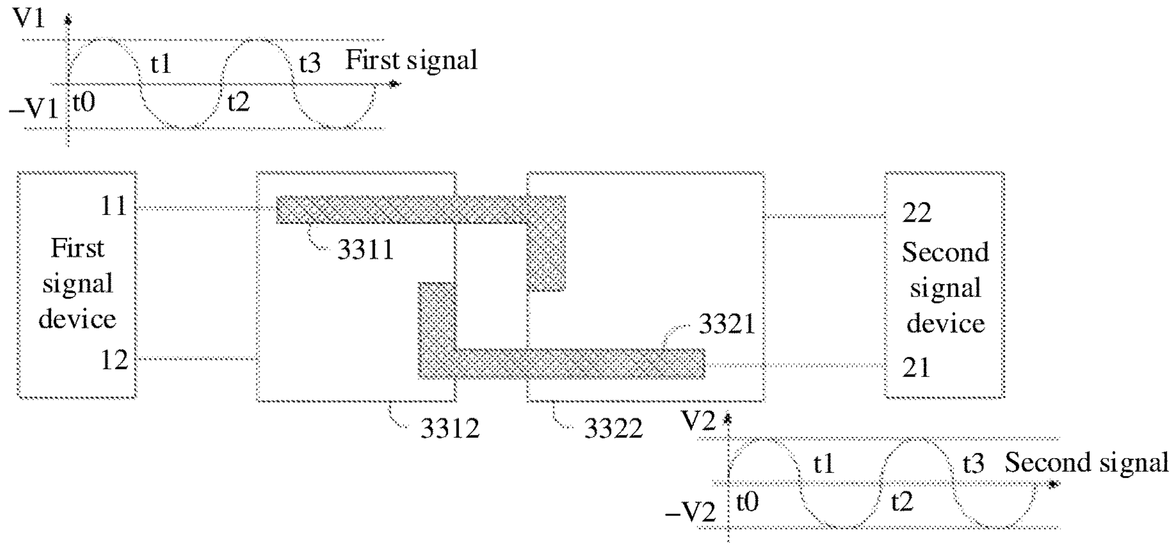
FIG. 12 is a schematic diagram of an operating principle of an electrical isolation apparatus.

With reference to FIG. 11 and FIG. 12, the following describes an isolation principle of the electrical isolation apparatus provided in this embodiment.

FIG. 11 is a schematic diagram of a principle of electric field coupling in the electrical isolation apparatus. Coupling refers to a process of transmitting a signal from one stage to another stage. The electric field coupling means that an interactive electric field is generated between two overlapping conductors under an action of a high-frequency alternating current, and a "displacement current" is generated between the two conductors under an action of the interactive electric field, to transmit energy between the two conductors. For example, as shown in FIG. 11, a conductor X and a conductor Y are disposed in parallel and opposite to each other. In this case, when positive charges are distributed on the conductor X, a parasitic capacitance is generated at an overlapping part of the conductor X and the conductor Y that are opposite to each other. Therefore, the conductor Y generates negative charges under an electric field coupling action of the parasitic capacitance. This is equivalent to that a current flowing from the conductor X to the conductor Y is generated between the conductor X and the conductor Y. The current is virtual and is transmitted from the conductor X to the conductor Y in a cross-conductor manner. Therefore, the current may also be referred to as a displacement current.

FIG. 12 is a schematic diagram of an operating principle of the electrical isolation apparatus, and shows an operating principle of performing, by the electrical isolation apparatus shown in FIG. 5, electrical isolation between a first signal device and a second signal device according to the principle of electric field coupling shown in FIG. 11. As shown in FIG. 12, a first signal sent by the first signal device to the electrical isolation apparatus 33 through a first port 11 and a second port 12 of the first signal device is denoted as an alternating current signal within a voltage range of −V1 to +V1.

In a positive half-cycle of the alternating current signal of the first signal, for example, in a time period of t0 to t1, the first signal device 1 outputs a current signal in a forward direction to the first transmission circuit 3311 of the electrical isolation apparatus 33 through the first port 11 of the first signal device 1, so that positive charges are distributed on the first transmission circuit 3311. In this case, the first part of the first transmission circuit 3311 and the first region of the first reference circuit 3312 constitute a return circuit, and the current signal successively passes through the first part and the first region to return to the second port 12 of the first signal device. In addition, because the second part of the first transmission circuit 3311 and the second region of the second reference circuit 3322 have an overlapping part, the positive charges distributed on the second part cause negative charges to be generated in the second region through electric field coupling shown in FIG. 11. Then the negative charges distributed on the second reference circuit 3322 in which the second region is located further cause positive charges to be generated on the second transmission circuit 3321, and the third part of the second transmission circuit 3321 and the third region of the second reference circuit 3322 can further constitute a return circuit, to generate a second signal to be transmitted to the second signal device 2. In this case (in the time period of t0 to t1), a current direction of the second signal is as follows: A current signal in a forward direction is output from a first port 21 of the second signal device 2, and the current signal successively passes through the third part of the second transmission circuit 3321 and the third region of the second reference circuit 3322 to return to a second port 22 of the second signal device 2.

In a negative half-cycle of the alternating current signal of the first signal, for example, in a time period of t1 to t2, the first signal device outputs a current signal in a forward direction to the first reference circuit 3311 through the second port 12. The first part of the first transmission circuit 3311 and the first region of the first reference circuit 3312 constitute a return circuit, and the current signal successively passes through the first region and the first part to return to the first port 11 of the first signal device, so that negative charges are distributed on the first transmission circuit 3311. In this case, the negative charges distributed on the second part cause positive charges to be generated in the second region through electric field coupling shown in FIG. 11. Then the positive charges distributed on the second reference circuit 3322 in which the second region is located further cause negative charges to be generated on the second transmission circuit 3321, and the third part of the second transmission circuit 3321 and the third region of the second reference circuit 3322 can further constitute a return circuit, to generate a second signal to be transmitted to the second signal device 2. In this case (in the time period of t1 to t2), a current direction of the second signal is as follows: A current signal in a forward direction is output from the second port 22 of the second signal device 2, and the current signal successively passes through the third region of the second reference circuit 3322 and the third part of the second transmission circuit 3321 to return to the first port 21 of the second signal device 2.

For subsequent positive half-cycles and negative half-cycles of the alternating current signal of the first electrical signal, refer to the change regularity of the moments t0 to t2. After the alternating current signal within the voltage range of −V1 to +V1 that is provided by the first signal device 1 passes through the electrical isolation apparatus 33, the second signal device can be enabled to receive an alternating current signal within a voltage range of −V2 to +V2. Particularly, the first signal and the second signal are current signals, and the first signal device 1 and the second signal device 2 provide voltages for the current signals through power supplies and ground ports respectively disposed in the first signal device 1 and the second signal device 2. For example, a voltage provided by the first signal device is V1, a voltage of the first signal sent by the first signal device ranges from −V1 to V1, a voltage provided by the second signal device is V2, and a voltage of the second signal received by the second signal device ranges from −V2 to V2. In this case, the electrical isolation apparatus 33 converts the first signal received by the primary stage into the second signal at the secondary stage. This is equivalent to that the change regularity of the alternating current of the first signal is transmitted from the primary stage to the secondary stage, so that phase changes of the first signal and the second signal are the same Amplitudes may be related to voltages provided by the first signal device and the second signal device. For example, the voltage V2 of the second signal and the voltage V1 of the first signal may be the same or different. In addition, the power supplies that are disposed in the first signal device and the second signal device and that provide voltages are not limited. For example, a power supply of the first signal device 1 can provide a voltage between the first port 11 and the second port 12 of the first signal device 1, and a power supply of the second signal device 2 can provide a voltage between the first port 21 and the second port 22 of the second signal device 2.

For example, when the electrical isolation apparatus provided in this embodiment is applied to the field of photovoltaic power generating technologies, a voltage of a first signal sent by a solar panel is relatively high and may usually reach hundreds of volts (greater than 100 V). After the first signal passes through the electrical isolation apparatus, because a phase of a second signal sent to a control device is the same as that of the first signal but a voltage may be several volts (less than 10 V) provided by the control device, a safety hazard caused by transmitting the first signal with a relatively high voltage to the second signal device is avoided. Further, information such as a change regularity of the first signal may be transmitted to the second signal device by using the second signal with a relatively low voltage, so that the second signal device can still receive the information in the first signal sent by the first signal device.

Correspondingly, in a scenario in which the second signal device sends a signal to the first signal device, because the electrical isolation apparatus is symmetrically disposed, when the second signal device sends a third signal to the electrical isolation apparatus, the electrical isolation apparatus may also send a fourth signal to the first signal device through electric field coupling. An implementation and an implementation principle thereof are the same as those in the embodiment in which the first signal sent by the first signal device is converted by the electrical isolation apparatus into the second signal to be sent to the second signal device. Details are not described again. For example, in a positive half-cycle of the third signal, positive charges distributed on the second transmission circuit 3321 cause negative charges to be generated in a fourth region of the first reference circuit 3312 through electric field coupling, and finally, a fourth signal whose return direction is from the first transmission circuit 3311 to the second reference circuit 3322 is generated. In a negative half-cycle, negative charges distributed on the second transmission circuit 3321 cause positive charges to be generated in the fourth region of the first reference circuit 3312 through electric field coupling, and finally, a fourth signal whose return direction is from the second reference circuit 3322 to the first transmission circuit 3311 is generated. Therefore, the electrical isolation apparatus can further output the fourth signal to the first signal device after converting the third signal sent by the second signal device. The third signal and the fourth signal may also have a same phase change, and amplitudes may be the same or different.

Optionally, in the embodiments, lengths of the first transmission circuit 3311 and the second transmission circuit 3321 may be set based on a wavelength of a processed signal, and the lengths of the first transmission circuit 3311 and the second transmission circuit 3321 are directly proportional to the wavelength. For example, a length of the first transmission circuit 3311 is a length of an entire “L” shape, and the length of the first transmission circuit 3311 is directly proportional to a wavelength of the first signal; and a length of the second transmission circuit 3321 is a length of an entire “L” shape, and the length of the second transmission circuit 3321 is directly proportional to a wavelength of the third signal.

To sum up, the electrical isolation apparatus provided in this embodiment is connected to the first signal device through the primary stage and is connected to the second signal device through the secondary stage. After the first signal sent by the first signal device is received, the first part, of the first transmission circuit of the primary stage, that extends to the secondary stage, and the first region of the second reference circuit of the secondary stage may be configured to jointly generate the second signal and send the second signal to the second signal device. After the third signal sent by the second signal device is received, the third part, of the second transmission circuit of the secondary stage, that extends to the primary stage, and the third region of the first reference circuit of the primary stage may be configured to jointly generate the fourth signal and send the fourth signal to the first signal device. Therefore, the electrical isolation apparatus provided in this embodiment has at least the following effects.

First, the electrical isolation apparatus provided in this embodiment transmits a signal between the primary stage and the secondary stage according to a principle of electric field coupling between conductors, so that a first signal can be immediately induced to the second reference circuit to generate a corresponding second signal, regardless of a frequency of the first signal, provided that a frequency change of the first signal causes a change of positive and negative charge distribution on the first transmission circuit. Therefore, the electrical isolation apparatus provided in this embodiment can be applied to isolation and transmission for a signal with a relatively high frequency, especially an RF signal. Therefore, compared with the technologies shown in FIG. 2 and FIG. 3, this embodiment enriches application scenarios of the electrical isolation apparatus, so that signal isolation and transmission are not limited by a signal frequency.

Second, the electrical isolation apparatus provided in this embodiment includes circuits in which different conductors are located, and a material used by the electrical isolation apparatus may be a common metal conductor, for example, a common PCB material may be used for implementation. Compared with devices such as the optical coupler and the magnetic core disposed in the technologies shown in FIG. 2 and FIG. 3, the electrical isolation apparatus greatly reduces its costs, so that the electrical isolation apparatus is easy to be manufactured and implemented.

Third, similarly, because a signal can be transmitted by using a conductor in a circuit in this embodiment, compared with a device, such as the optical coupler shown in FIG. 2, whose service life is reduced due to a limitation by a service life of a diode, a metal conductor does not easily age, and does not decay with changes of time and operating environments during operating, thereby further extending a service life of the electrical isolation apparatus, improving reliability, and reducing costs caused by frequently updating the electrical isolation apparatus.

Fourth, similarly, because a signal can be transmitted by using a conductor in a circuit in this embodiment, compared with a device, such as the isolation transformer shown in FIG. 3, that has a disadvantage of a relatively large size due to the disposing of the magnetic core, the electrical isolation apparatus can effectively reduce its size, so that flexibility of disposing the electrical isolation apparatus is improved.

Fifth, the electrical isolation apparatus provided in this embodiment isolates a signal between the first signal device and the second signal device. In addition, because the primary stage and the secondary stage can be understood as being symmetrically disposed, bidirectional signal transmission between the first signal device and the second signal device can be implemented. Compared with a device, such as the optical coupler shown in FIG. 2, that can implement only unidirectional signal transmission, the electrical isolation apparatus enriches its functions, so that usage efficiency of the electrical isolation apparatus is improved.

Sixth, in the electrical isolation apparatus provided in this embodiment, phases of input and output signals are the same, so that a 0-degree phase shift can be achieved for the input and output signals. In some radio frequency systems that are relatively sensitive to input and output phases, the electrical isolation apparatus can also be used, and can ensure stable phases without shifts, thereby enriching application scenarios of the electrical isolation apparatus.

Seventh, a "cross" coupling manner is used for the electrical isolation apparatus provided in this embodiment. The first transmission circuit of the primary stage serves as a signal terminal and is coupled to the second transmission circuit of the secondary stage that serves as a ground (GND) terminal, or the second transmission circuit of the secondary stage serves as a signal terminal and is coupled to the first transmission circuit of the primary stage that serves as a ground (GND) terminal. Compared with a signal-signal or GND-GND non-cross coupling manner in some technologies, this manner is more flexible, and an insertion loss caused between the first signal device and the second signal device by disposing the electrical isolation apparatus can be further reduced.

Figure 13:
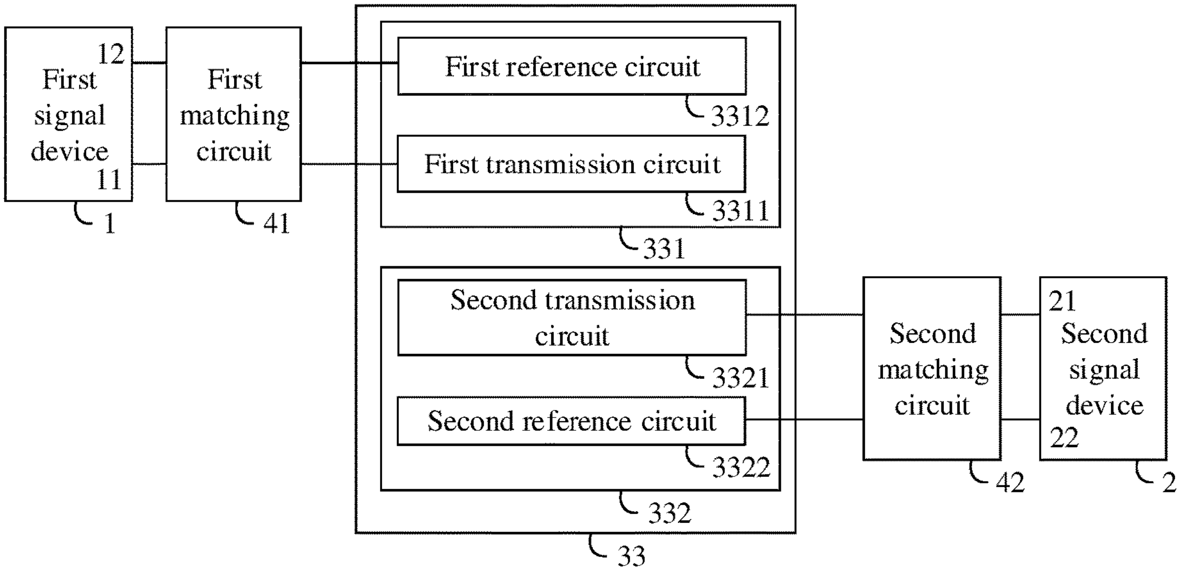
FIG. 13 is a schematic diagram of a structure of an embodiment of an electrical isolation apparatus.

Further, FIG. 13 is a schematic diagram of a structure of an embodiment of an electrical isolation apparatus. On a basis of the electrical isolation apparatus shown in FIG. 4, a first matching circuit 41 and a second matching circuit 42 are further included in the embodiment shown in FIG. 13. The first matching circuit 41 is disposed between the first signal device 1 and the primary stage 331 of the electrical isolation apparatus 33 and is configured to perform impedance matching on a signal passing through the first matching circuit 41. The second matching circuit 42 is disposed between the second signal device 2 and the secondary stage 332 of the electrical isolation apparatus 33 and is configured to perform impedance matching on a signal passing through the second matching circuit 42. The impedance refers to an obstruction function performed by a current in a transmission circuit. The impedance matching is performed on the transmission circuit. A matching unit is used to make the impedance on the transmission circuit continuous, so that all signals at a transmit end can be transmitted to a receive end, and no signal is reflected back to the transmit end, thereby improving energy efficiency of the signals. For example, in this embodiment, when a first signal is a radio frequency (RF) signal, because a frequency is relatively high, to achieve a standard impedance of 50Ω for a common input/output interface, the first matching circuit 41 may be configured to perform signal impedance matching with a standard impedance of 50Ω on the first port 11 and the second port 12 of the first signal device 1, and the second matching circuit 42 may be configured to perform impedance matching with a standard impedance of 50Ω on the first port 21 and the second port 22 of the second signal device 2. Optionally, implementations of the first matching circuit 41 and the second matching circuit 42 may be the same or different, and available matching circuits include: matching through printed circuit board (PCB) wiring, matching by using discrete resistor-capacitor devices, and the like.

Figure 14:
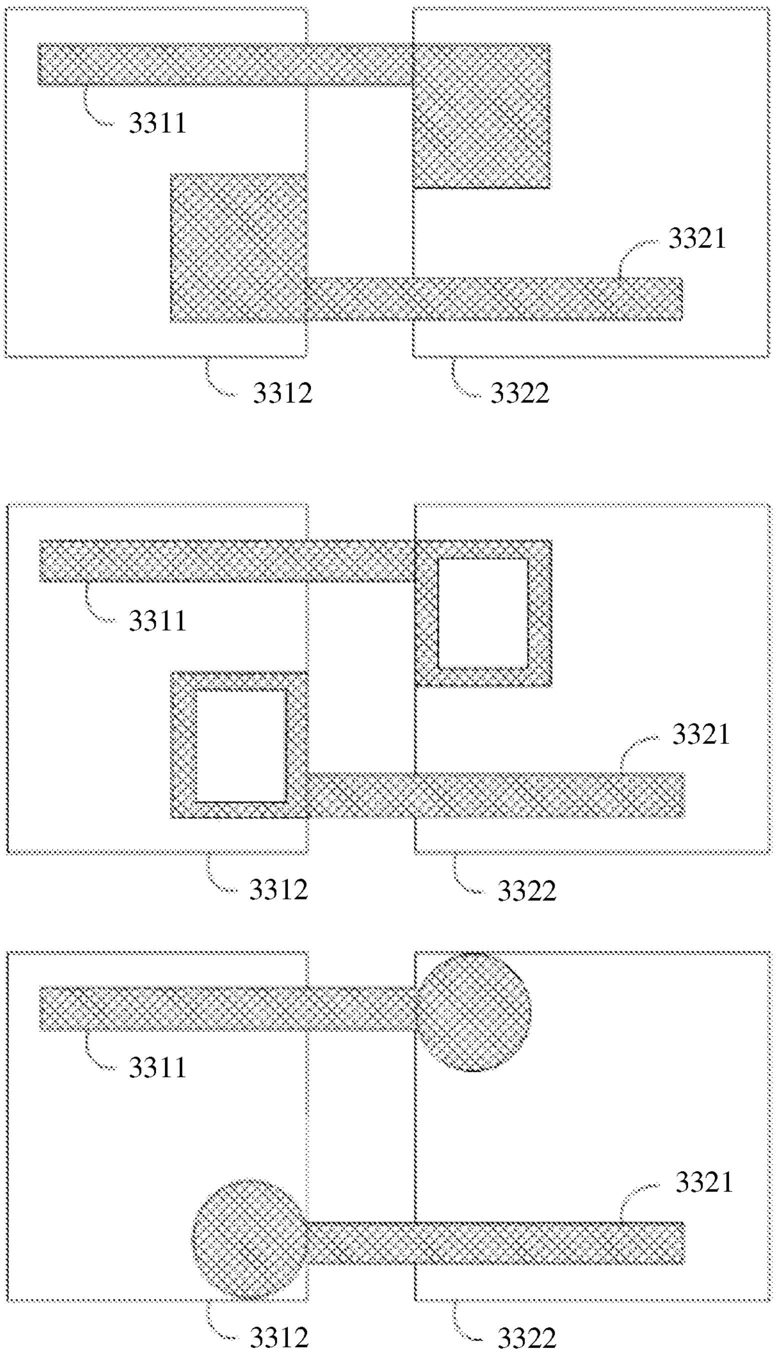
FIG. 14 is a schematic diagram of another shape of a transmission circuit.

Optionally, in the embodiments, an example in which the first transmission circuit 3311 and the second transmission circuit 3321 are in a shape of a letter "L" is used. In another possible implementation, shapes of the first transmission circuit 3311 and the second transmission circuit 3321 may be alternatively adjusted based on factors such as a working condition or a spatial layout in the electrical isolation apparatus. For example, FIG. 14 is a schematic diagram of another shape of a transmission circuit. In the embodiment shown in FIG. 14, a shape of the second part, of the first transmission circuit 3311, that extends to the secondary stage may be another shape such as a rectangular shape, a ring shape, or a circular shape. Correspondingly, a shape of the fourth part, of the second transmission circuit 3322, that extends to the primary stage is the same as the shape of the second part, and for example, may also be another shape such as a rectangular shape, a ring shape, or a circular shape.

Optionally, materials of the first transmission circuit 3311, the second transmission circuit 3321, the first reference circuit 3312, and the second reference circuit 3322 may be copper foil metal conductors.

Optionally, materials of the first insulation circuit 3313, the second insulation circuit 333, and the third insulation circuit 3323 may be filler insulation materials whose model is FR4 (a code of a fire-resistant material class), air, plastic, or the like. An insulation circuit may be disposed to prevent discharge, creepage, and the like between conductors on two sides of the insulation circuit. In addition, a non-conducting insulation material may prevent voltage breakdown between conductors on two sides and ensure physical isolation between the conductors on the two sides. In addition, the foregoing insulation circuits may further serve as support structures for the entire electrical isolation apparatus and provide integral support for the entire apparatus.

Figure 15:
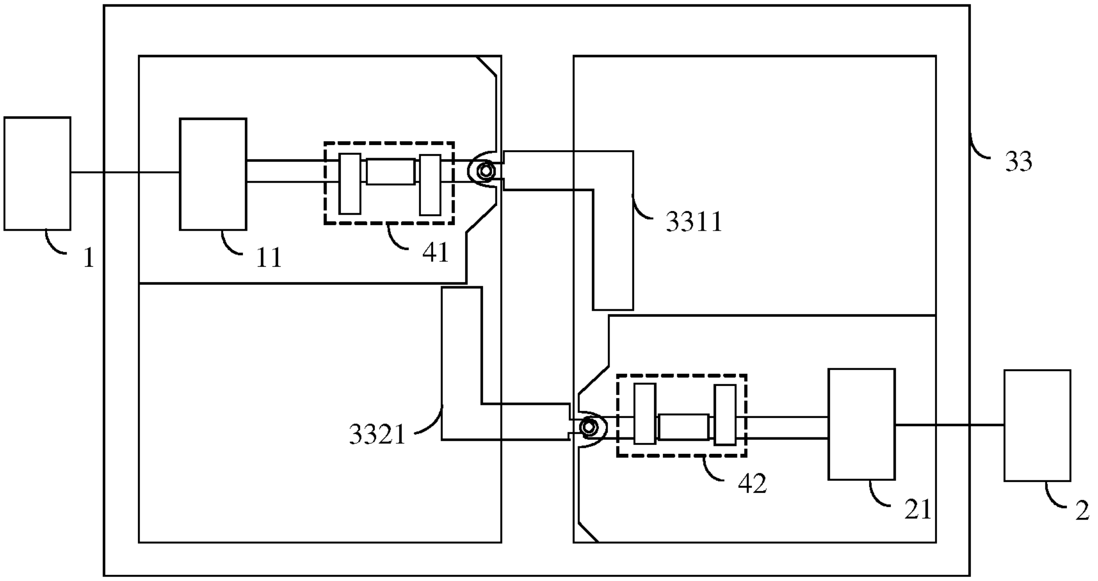
FIG. 15 is a structural diagram of an engineering application of an electrical isolation apparatus.

FIG. 15 is a structural diagram of the electrical isolation apparatus. FIG. 15 shows the electrical isolation apparatus 33 in a radio frequency communications system. The electrical isolation apparatus 33 shown in FIG. 15 is implemented by a PCB. A pass-band center frequency of the electrical isolation apparatus 33 may be 2.4 GHz. The first port 11 is further disposed at the primary stage of the electrical isolation apparatus 33 and is configured to connect to the first signal device 1. Optionally, when the electrical isolation apparatus 33 is applied to a radio frequency communications system, the first signal device 1 may be connected to a radio frequency IC device and a transceiver antenna, and the first port may be an IPEX terminal. In addition, to facilitate connection for a radio frequency signal, both the first port 11 and the second port 12 may be IPEX terminals. In addition, the IPEX terminals may be disposed at a surface layer of the PCB, and the first matching circuit 41 and the second matching circuit 42 may also be disposed at the surface layer of the PCB. In addition, a memory signal may be connected to an inner-layer coupling conductor through a via, so that inner-layer signal coupling can be implemented, and direct current (DC) withstand voltage safety isolation at a KV (a voltage level) level can be achieved.

In embodiments shown in FIG. 5 to FIG. 15, the provided electrical isolation apparatus may be implemented by a four-layer PCB (the first transmission circuit, the first reference circuit, the second transmission circuit, and the second reference circuit are respectively disposed at different layers, and there are four layers in total). To reduce a quantity of layers of the electrical isolation apparatus, signal isolation and information transmission may be performed by using the same principle of electric field coupling, and fewer PCB layers may be used for implementation.

Figure 16:
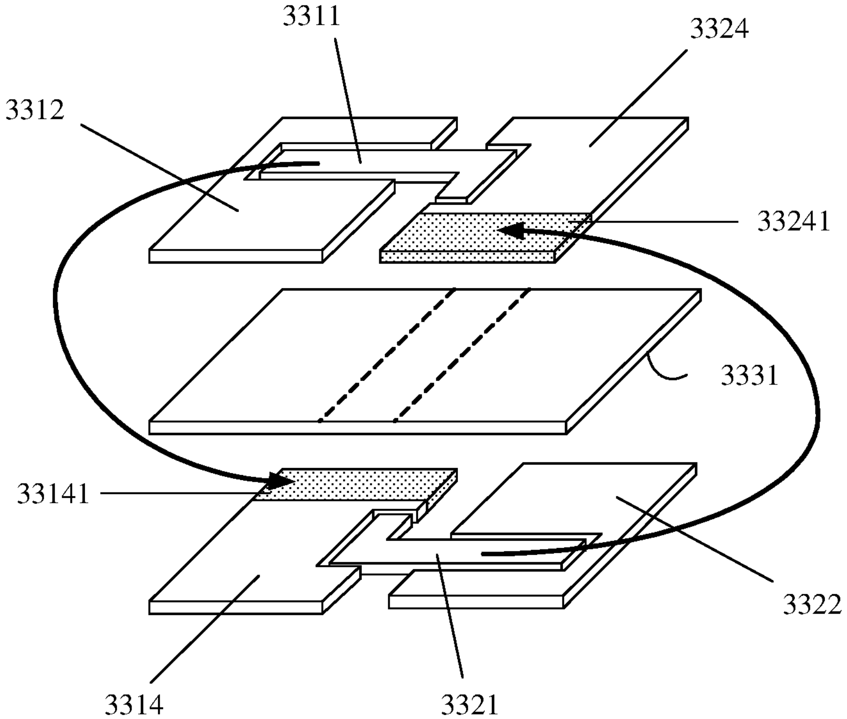
FIG. 16 is a schematic diagram of a structure of an embodiment of an electrical isolation apparatus.

For example, FIG. 16 is a schematic diagram of a structure of an embodiment of an electrical isolation apparatus. A primary stage of the electrical isolation apparatus includes a first transmission circuit 3311, a first reference circuit 3312, and a first return circuit 3314. A secondary stage includes a second transmission circuit 3321, a second reference circuit 3322, and a second return circuit 3324. The first transmission circuit 3311, the first reference circuit 3312, and the second return circuit 3324 are disposed on a same plane, that is, an uppermost plane in FIG. 16. The second transmission circuit 3321, the second reference circuit 3322, and the first return circuit 3314 are disposed on a same plane, that is, a lowermost plane in FIG. 16.

Optionally, a fourth insulation circuit 3331 may be further disposed between the primary stage and the secondary stage, and is configured to isolate and support a plane on which the first transmission circuit 3311, the first reference circuit 3312, and the second return circuit 3324 are located, and a plane on which the second transmission circuit 3321, the second reference circuit 3322, and the first return circuit 3314 are located.

Further, the first transmission circuit 3311, the first reference circuit 3312, the first return circuit 3314, the second transmission circuit 3321, the second reference circuit 3322, and the second return circuit 3324 are not in contact with each other and are disposed in parallel to one plane (denoted as a first plane). In this case, by using a plane on which the fourth insulation circuit 3331 is located as a reference, it can be understood that, there is a spacing between a projection of the first reference circuit 3312 on the first plane and a projection of the second return circuit 3324 on the first plane, there is also a spacing between the projection of the first reference circuit 3312 on the first plane and a projection of the second reference circuit 3322 on the first plane, there is also a spacing between the projection of the second reference circuit 3322 on the first plane and a projection of the first return circuit 3314 on the first plane, and there is also a spacing between the projection of the first return circuit 3314 on the first plane and the projection of the second reference circuit 3324 on the first plane.

Figure 17:
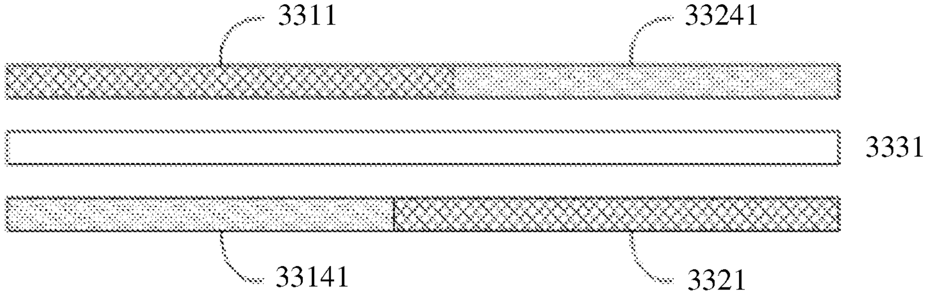
FIG. 17 is a schematic diagram of a structure of a cross section of an electrical isolation apparatus.

FIG. 17 is a schematic diagram of a structure of a cross section of the electrical isolation apparatus. With reference to the cross sections shown in FIG. 16 and FIG. 17, the first transmission circuit 3311 includes a first part and a second part. The first part is disposed directly above a first return structure 33141 disposed in the first return circuit 3314. A projection of the first part on the first plane falls within a projection of the first return structure 33141 on the first plane. A projection of the second part of the first transmission circuit 3311 on the first plane overlaps with a projection of a second region of the second reference circuit 3322 on the first plane. The second transmission circuit 3321 includes a third part and a fourth part. The third part is disposed directly below a second return structure 33241 disposed in the second return circuit 3324. A projection of the third part on the first plane falls within a projection of the second return structure 33241 on the first plane. A projection of the fourth part of the second transmission circuit 3321 on the first plane overlaps with a projection of a fourth region of the first reference circuit 3312 on the first plane. In this case, refer to the same principle shown in FIG. 8 to FIG. 12, the first transmission circuit 3311, the second reference circuit 3322, the second transmission circuit 3321, and the first reference circuit 3312 may be configured to implement signal isolation and information transmission between devices on two sides of the electrical isolation apparatus.

The first transmission circuit 3311 and the first reference circuit 3312 may be connected to a first signal device, the second transmission circuit 3321 and the second reference circuit 3322 may be connected to a second signal device, a first signal sent by the first signal device may be transmitted through the first transmission circuit 3311 and the first reference circuit 3312 (transmission is performed through electric field coupling on a plane on which the first transmission circuit 3311 overlaps with the projection of the first reference circuit 3312). When positive charges are distributed on the first transmission circuit 3311, the second part of the first transmission circuit 3311 and the second region of the second reference circuit 3322 have an overlapping part, and the positive charges distributed on the second part cause negative charges to be generated in the second region through the electric field coupling shown in FIG. 11. Then the negative charges distributed on the second reference circuit 3322 in which the second region is located further cause positive charges to be generated on the second transmission circuit 3321. The second transmission circuit 3321 and the second reference circuit 3322 can further constitute a return circuit (transmission is performed through electric field coupling on a plane on which the second transmission circuit 3321 overlaps with the projection of the second reference circuit 3322), to generate a second signal to be transmitted to the second signal device 2.

Optionally, because a part of the first transmission circuit 3311 and a part of the first reference circuit 3312 that overlap with each other have a relatively small area, for stability of signal transmission between the first transmission circuit 3311 and the first reference circuit 3312, the first return circuit 3314 is further disposed below the first transmission circuit 3311 in FIG. 16. In addition, the first return structure 33141 disposed in the first return circuit 3314 provides a reference plane for the first transmission circuit 3311. The first transmission circuit 3311 may be connected to the first return structure 33141 through a via provided in the fourth insulation circuit 3331.

Similarly, for stability of signal transmission between the second transmission circuit 3321 and the second reference circuit 3322, the second return circuit 3324 is further disposed above the second transmission circuit 3321 in FIG. 16. In addition, the second return structure 33241 disposed in the second return circuit 3324 provides a reference plane for the second transmission circuit 3321. The reference plane may be a reference ground plane. The second transmission circuit 3321 may be connected to the second return structure 33241 through a via provided in the fourth insulation circuit 3331. In addition, the first return structure 33141 and the second return structure 33241 may be connected (a connection relationship is not shown in the figure), to provide a same reference plane for the primary stage and the secondary stage of the electrical isolation apparatus.

Correspondingly, when negative charges are distributed on the first transmission circuit 3311, the negative charges distributed on the second part cause positive charges to be generated in the second region through electric field coupling shown in FIG. 11. Then the positive charges distributed on the second reference circuit 3322 in which the second region is located further cause negative charges to be generated on the second transmission circuit 3321. The second transmission circuit 3321 and the second reference circuit 3322 can further constitute a return circuit (transmission is performed through electric field coupling on a plane on which the second transmission circuit 3321 overlaps with the projection of the second reference circuit 3322), to generate a second signal to be transmitted to the second signal device 2.

In a scenario in which the second signal device sends a signal to the first signal device, because the electrical isolation apparatus is symmetrically disposed, when the second signal device sends a third signal to the electrical isolation apparatus, the electrical isolation apparatus may also send a fourth signal to the first signal device through electric field coupling. An implementation and an implementation principle thereof are the same as those in the embodiment in which the first signal sent by the first signal device is converted by the electrical isolation apparatus into the second signal to be sent to the second signal device. Details are not described again.

To sum up, the electrical isolation apparatus provided in this embodiment is implemented by a PCB with fewer layers on a basis of keeping a principle and an effect same as those in FIG. 5 to FIG. 15, thereby reducing structural complexity of the electrical isolation apparatus, and making implementation of the electrical isolation apparatus more flexible and effective.

Further, in the embodiments, a structure of the electrical isolation apparatus is described in detail. To implement electrical isolation, on a basis of having a structure same as that of the electrical isolation apparatus, another electronic device may also implement information transmission through software while isolating a signal.

For example, a signal transmission method may be performed by an electronic device whose structure is the same as that of the electrical isolation apparatus in FIGS. 5 to 17. The signal transmission method may include the following steps.

S101. The electronic device obtains a first signal from a first signal device.

The electronic device serving as an execution entity is connected to both the first signal device and a second signal device, but the first signal device and the second signal device are not in direct contact with each other through the electronic device. When sending the first signal to the second signal device, the first signal device first sends the first signal to the electronic device, and the electronic device receives the first signal sent by the first signal device.

S102. The electronic device inputs the received first signal into a first transmission circuit and a first reference circuit.

S103. The electronic device receives a second signal output by a second transmission circuit and a second reference circuit.

A manner of disposing the first transmission circuit, the first reference circuit, the second transmission circuit, and the second reference circuit may be the same as that of disposing the electrical isolation apparatus in any one of embodiments in FIG. 5 to FIG. 17. An implementation and a principle thereof are the same. Details are not described again.

S104. The electronic device sends the second signal obtained in S103 to the second signal device.

Thus, in the signal transmission method provided in this embodiment, when the first signal device and the second signal device are not in contact, the first signal sent by the first signal device can be converted into the second signal, and then the second signal can be sent to the second signal device. Therefore, information transmission between the first signal device and the second signal device is not affected while electrical isolation is implemented between the first signal device and the second signal device. Thus, in this embodiment, a signal is transmitted between the first transmission circuit, the first reference circuit, the second transmission circuit, and the second reference circuit according to a principle of electric field coupling between conductors. Therefore, this embodiment can be applied to isolation and transmission for a signal with a relatively high frequency, especially an RF signal, between the first signal device and the second signal device. Therefore, application scenarios are enriched, and signal isolation and transmission are not limited by a signal frequency. In addition, a material used for the first transmission circuit, the first reference circuit, the second transmission circuit, and the second reference circuit configured to implement the signal transmission method in this embodiment may be a common metal conductor, for example, a common PCB material may be used for implementation, thereby greatly reducing a size and costs of the electrical isolation apparatus, and facilitating manufacturing and implementation of the electrical isolation apparatus. In other words, in the method provided in this embodiment, a frequency applicable to isolating the first signal device from the second signal device can be increased, and a signal can be converted by using a circuit with a relatively small size and relatively low costs.

A person of ordinary skill in the art may understand that all or a part of the steps in each of the foregoing method embodiments may be implemented by hardware related to program commands. The program may be stored in a computer-readable storage medium. When the program is executed, the steps in the foregoing method embodiments are performed. The foregoing storage medium includes any medium that can store program code, such as a ROM, a RAM, a magnetic disk, or an optical disc.

Finally, it should be noted that the foregoing embodiments are merely used to describe the embodiments, but are not intended as limiting. Although described in detail with reference to the foregoing embodiments, a person of ordinary skill in the art should understand that the solutions described in the foregoing embodiments may still be modified, or some or all features thereof may be equivalently replaced. These modifications or replacements do not depart from the scope of the solutions in the embodiments.

What is claimed is:

1. An electrical isolation apparatus, comprising:

a primary stage configured to connect to a first signal device, wherein the primary stage comprises a first reference circuit and a first transmission circuit; and a secondary stage configured to connect to a second signal device, wherein the secondary stage comprises a second transmission circuit and a second reference circuit, wherein the first reference circuit, the first transmission circuit, the second transmission circuit, and the second reference circuit are not in contact with each other, and are sequentially disposed in parallel to a first plane, and there is a spacing between a projection of the first reference circuit on the first plane and a projection of the second reference circuit on the first plane;

the first transmission circuit comprises a first part and a second part; wherein a projection of the first part on the first plane overlaps with a projection of a first region of the first reference circuit on the first plane, and a projection of the second part on the first plane overlaps with a projection of a second region of the second reference circuit on the first plane; and the second transmission circuit comprises a third part and a fourth part; wherein a projection of the third part on the first plane overlaps with a projection of a third region of the second reference circuit on the first plane, and a projection of the fourth part on the first plane overlaps with a projection of a fourth region of the first reference circuit on the first plane.

2. The electrical isolation apparatus according to claim 1, wherein the apparatus further comprises at least one of:

a first insulation circuit, parallel to the first plane, disposed between the first reference circuit and the first transmission circuit, and configured to isolate the first reference circuit from the first transmission circuit;

a second insulation circuit, parallel to the first plane, disposed between the first transmission circuit and the second transmission circuit, and configured to isolate the first transmission circuit from the second transmission circuit; and a third insulation circuit, parallel to the first plane, disposed between the second transmission circuit and the second reference circuit, and configured to isolate the second transmission circuit from the second reference circuit.

3. The electrical isolation apparatus according to claim 1, wherein the apparatus further comprises at least one of:

a first matching circuit, disposed between the first signal device and the primary stage, and configured to perform impedance matching on a signal passing through the first matching circuit; and a second matching circuit, disposed between the second signal device and the secondary stage, and configured to perform impedance matching on a signal passing through the second matching circuit.

4. The electrical isolation apparatus according to claim 1, wherein a shape of the second part comprises a circular shape, a rectangular shape, a ring shape, or a shape of a letter L; and a shape of the fourth part is the same as that of the second part.

5. The electrical isolation apparatus according to claim 2, wherein materials of the first transmission circuit, the second transmission circuit, the first reference circuit, and the second reference circuit are copper foil metal conductors; and materials of the first insulation circuit, the second insulation circuit, and the third insulation circuit are filler insulation materials.

6. An electrical isolation apparatus, comprising:

a primary stage configured to connect to a first signal device, wherein the primary stage comprises a first transmission circuit, a first return circuit, and a first reference circuit; and a secondary stage configured to connect to a second signal device, wherein the secondary stage comprises a second transmission circuit, a second return circuit, and a second reference circuit, wherein the first transmission circuit, the first reference circuit, and the second return circuit are disposed on a same plane, and the second transmission circuit, the second reference circuit, and the first return circuit are disposed on a same plane;

the first reference circuit, the first transmission circuit, the second transmission circuit, the second reference circuit, the first return circuit, and the second return circuit are not in contact with each other, and are each disposed in parallel to a first plane; there is a spacing between a projection of the first reference circuit on the first plane and a projection of the second return circuit on the first plane, and there is a spacing between a projection of the second reference circuit on the first plane and a projection of the first return circuit on the first plane;

the first transmission circuit comprises a first part and a second part; wherein a projection of the first part on the first plane falls within a projection, on the first plane, of a first return structure disposed in the first return circuit, and a projection of the second part on the first plane overlaps with a projection of a second region of the second reference circuit on the first plane; and the second transmission circuit comprises a third part and a fourth part; wherein a projection of the third part on the first plane falls within a projection, on the first plane, of a second return structure disposed in the second return circuit, and a projection of the fourth part on the first plane overlaps with a projection of a fourth region of the first reference circuit on the first plane.

7. The electrical isolation apparatus according to claim 6, wherein the apparatus further comprises:

a fourth insulation circuit, parallel to the first plane, and disposed between a plane on which the first transmission circuit, the first reference circuit, and the second return circuit are located and a plane on which the second transmission circuit, the second reference circuit, and the first return circuit are located.

8. The electrical isolation apparatus according to claim 6, wherein the apparatus further comprises at least one:

a first matching circuit, disposed between the first signal device and the primary stage, and configured to perform impedance matching on a signal passing through the first matching circuit; and a second matching circuit, disposed between the second signal device and the secondary stage, and configured to perform impedance matching on a signal passing through the second matching circuit.

9. The electrical isolation apparatus according to claim 6, wherein a shape of the second part comprises a circular shape, a rectangular shape, a ring shape, or a shape of a letter L; and a shape of the fourth part is the same as that of the second part.

10. The electrical isolation apparatus according to claim 7, wherein materials of the first transmission circuit, the second transmission circuit, the first reference circuit, and the second reference circuit are copper foil metal conductors; and a material of the fourth insulation circuit is a filler insulation material.

11. A signal transmission method, comprising:

obtaining a first signal from a first signal device;

inputting the first signal into a first transmission circuit and a first reference circuit;

receiving a second signal output by a second transmission circuit and a second reference circuit, wherein the first reference circuit, the first transmission circuit, the second transmission circuit, and the second reference circuit are not in contact with each other and are sequentially disposed in parallel to a first plane; there is a spacing between a projection of the first reference circuit on the first plane and a projection of the second reference circuit on the first plane; the first transmission circuit comprises a first part and a second part, wherein a projection of the first part on the first plane overlaps with a projection of a first region of the first reference circuit on the first plane; and a projection of the second part on the first plane overlaps with a projection of a second region of the second reference circuit on the first plane; the second transmission circuit comprises a third part and a fourth part, wherein a projection of the third part on the first plane overlaps with a projection of a third region of the second reference circuit on the first plane; and a projection of the fourth part on the first plane overlaps with a projection of a fourth region of the first reference circuit on the first plane; and sending the second signal to a second signal device.

* * * * *